May 30, 1933.   F. M. REID   1,911,771
VEHICLE CONSTRUCTION
Filed Oct. 12, 1931   2 Sheets-Sheet 2
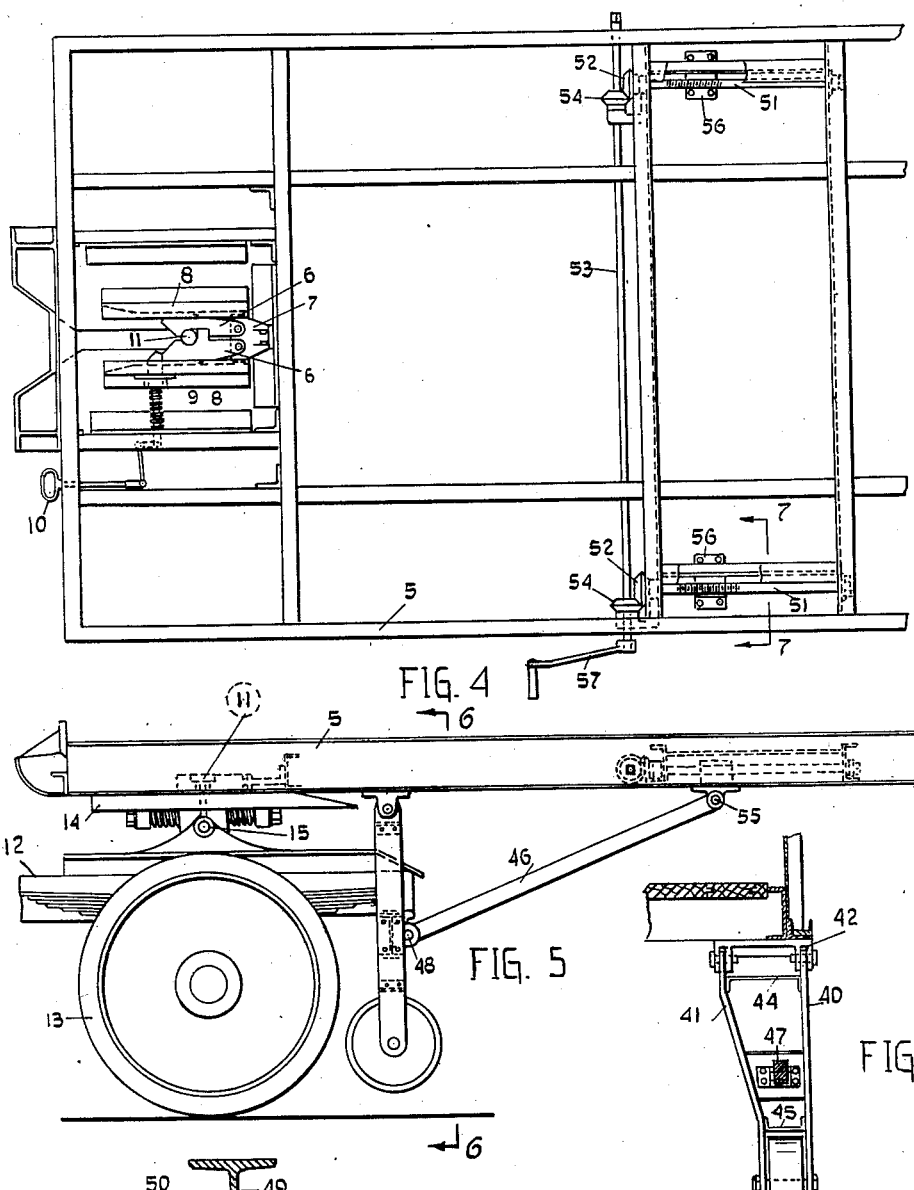
INVENTOR.
FREDERICK M. REID
BY Barnes and Kisselle
ATTORNEYS.

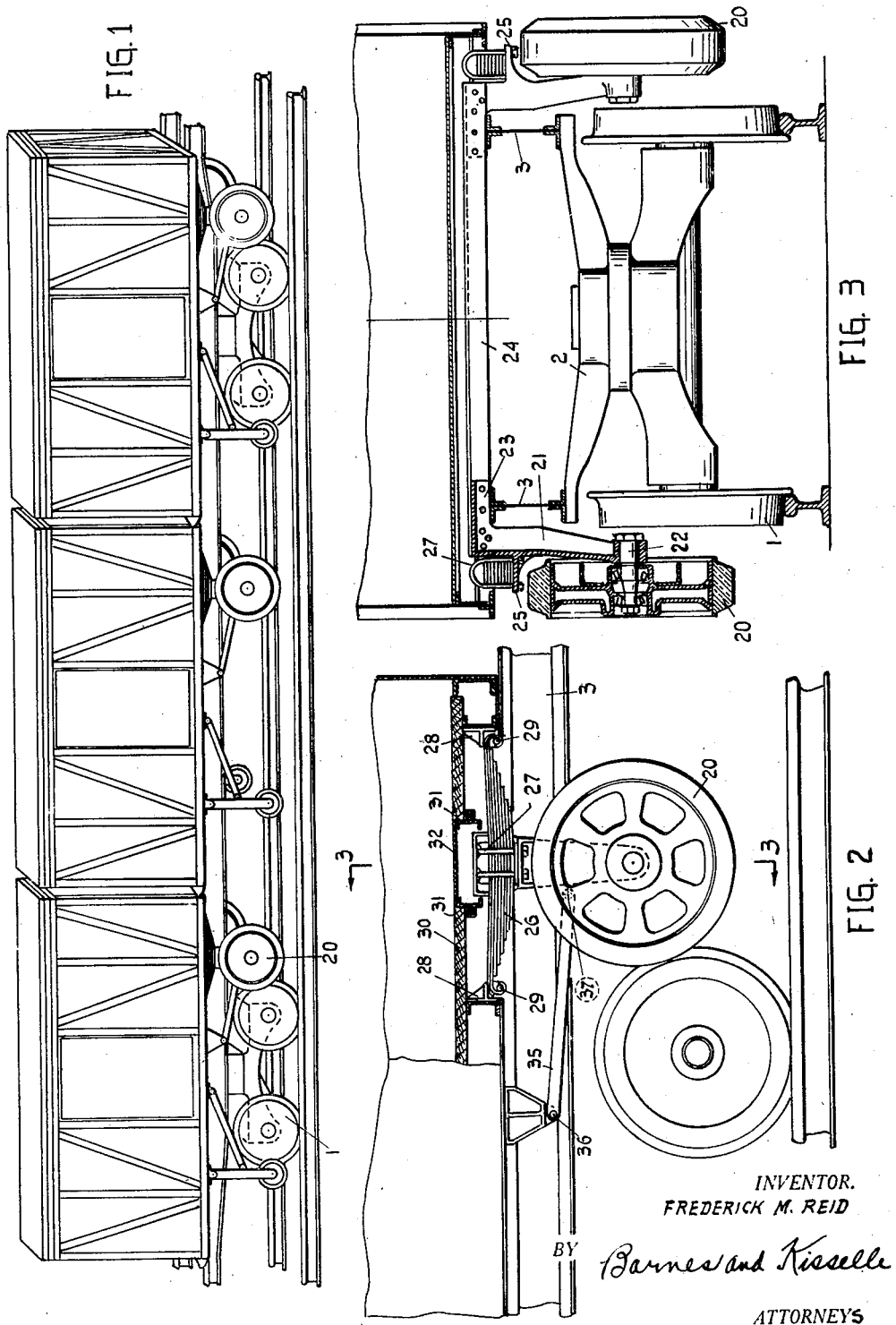

Patented May 30, 1933

1,911,771

UNITED STATES PATENT OFFICE

FREDERICK MALCOLM REID, OF DETROIT, MICHIGAN, ASSIGNOR TO FRUEHAUF TRAILER CORPORATION, OF DETROIT, MICHIGAN, A CORPORATION OF MICHIGAN

VEHICLE CONSTRUCTION

Application filed October 12, 1931. Serial No. 568,390.

This invention relates to a construction of vehicles designed for operation upon roads and highways and designed to be carried by another vehicle, as for example a railroad car. Such a vehicle may be loaded, operated over a road or highway to a suitable loading place where the entire vehicle may be placed upon a railroad car and transported thereby. The operation of the road vehicle over the highway may be a relatively short haul, and the transportation upon a railroad car may be a relatively long haul.

This invention is concerned particularly with trailer vehicles designed to be drawn by a tractor, and as shown herein the particular trailer vehicle is of the type known as a semi-trailer which is one having road engaging wheels at one end, but the other end of which during operation over a highway, rests upon and is supported by a tractor.

Among the objects of the invention is the provision of an improved construction in a trailer vehicle which may rest upon a railroad car or the like with the underside of its floor or platform supported by supporting elements of the railroad car, and for this purpose the invention is directed towards the provision of an improved construction in the nature of an axle and spring suspension for the road wheels of a trailer, whereby to permit of this action and to provide a construction suitable for operation over the highways. Another object of the invention is the provision of an improved support arrangement for the forward end of the trailer for supporting the same when detached from a tractor and when not carried by a railroad car, which at the same time, readily permits of mounting the trailer on a railroad car or the like.

In the accompanying drawings:

Fig. 1 depicts a railroad car upon which is mounted three of the vehicles designed in accordance with this invention.

Fig. 2 is a view with parts cut away and parts in section illustrating some of the structural features of the vehicle.

Fig. 3 is a section taken substantially on line 3—3 of Fig. 2.

Fig. 4 is a plan view of the trailer frame illustrating the control for the support at the forward end of the trailer.

Fig. 5 is a side view in illustration of a trailer in operative relation with the tractor showing the trailer supports in operative position.

Fig. 6 is a sectional view taken substantially on line 6—6 of Fig. 5.

Fig. 7 is a sectional view taken substantially on line 7—7 of Fig. 4.

A railroad car in the nature of a flat car is shown in Fig. 1 having rail engaging wheels 1, frame supporting structure 2 and supporting members 3. No attempt is made herein of showing in detail the particular construction of the railroad car as this is subject to variation and may follow the lines of general practice in the railroad art; suffice to say that preferably the supporting elements or frame of a railroad car be relatively narrow so as to permit the trailer vehicles of this invention to pass thereover and rest thereon.

Referring to Fig. 4, it will be noted that the trailer vehicle has a frame 5, which at the forward end is equipped with latching means for attachment to a tractor. Such latching means comprises latch members 6 pivotally mounted upon a head 7, reciprocable in guides 8 and held in locked position by latch 9 operable by handle 10. In latched position a king pin 11 on the tractor is engaged by the latches. This type of tractor-trailer connection need not be further described as it is fully described in Patent No. 1,641,354, dated September 6, 1927. Moreover, this particular latching arrangement may be varied insofar as the present invention is concerned.

In Fig. 5 it will be noted that the rear end of a tractor is supporting the trailer frame, the tractor comprising the frame 12 having wheels 13, and the tractor carrying a fifth wheel 14 which has the king pin, and upon which the forward end of the trailer frame is supported. The fifth wheel may be pivoted as at 15 so that it may incline rearwardly to permit of the tractor backing into the trailer and elevating the same.

The rear road-engaging wheels of the trailer vehicle are represented at 20, and the axle construction of these wheels is such as to permit movement between them of the transporting rail car. On each side of the vehicle there is a bracket 21 carrying at its lower end a spindle 22 upon which a wheel is mounted. This bracket has a laterally extending head portion 23 secured as by means of rivets, bolts or otherwise to a transverse member 24 which, as shown herein, may be in the form of a channel member. Each bracket has an extension or shelf-like member 25 for supporting each a spring 26 held thereon by U bolts or the like 27. The ends of the spring support the trailer frame. This may be done by means of brackets 28 secured to transverse sills of the frame, as shown in Fig. 2, resting upon the ends of the springs. Some of the spring leaves may be hooked over the bolts 29 to prevent the brackets from jumping off the springs.

The transverse member 24 is positioned in close proximity to the floor of platform 30 of the vehicle and to permit of spring flexure, the floor 30 may be divided as shown in Fig. 2 to form a transverse cut through the floor, the opening of which may be defined by members such as channel iron 31 supporting a metal plate 32 flush with the platform 30. This permits of mounting the transverse axle member close to the platform of the vehicle to obtain maximum vertical clearance between the road wheels and at the same time affording spring flexure by reason of the transverse member 24 being capable of moving upwardly as regards the vehicle frame beyond the lowermost surface of the trailer platform. For stabilizing the axle and wheel construction each bracket 21 may be equipped with a radius rod 35 pivotally mounted to a bracket on the frame of the vehicle, as at 36, and pivotally secured to the brackets 21 as at 37. The under side of the transverse axle member may be substantially flush with the under side of the vehicle frame; the vehicle frame thus may rest directly upon the rail car.

At the forward end the trailer is provided with supports movable into and out of operating position. Said supports comprise a pair of legs pivotally mounted on the trailer frame. Each leg may consist of an element 40, an element 41, each hinged to the trailer frame by means of pins taken through the bracket 42, and at their lower end carrying a ground engaging-wheel 43. These spaced members may be adequately re-inforced by cross supporting members 44 and 45. A link 46 is connected to each leg by a pivotal connection, to a cross member 47, such pivotal connection being shown at 48, and these links are associated with operating mechanism whereby both supporting legs may be operated from one side of the vehicle. Each link is pivotally connected as at 55 to a reciprocating head 56 each of which may reciprocate on an eye beam 49 constituting part of the trailer frame. This head comprises a portion having an internally screw threaded aperture 50. Two screw shafts are journaled in the frame, these being shown at 51 and each is provided with a miter gear 52. A transverse operating shaft 53 is provided with miter gears 54, the teeth of which mesh with miter gears 52. The ends of the shaft 53 may be suitably shaped for the reception of a crank 57 for operating purposes.

It will be observed that by rotating the shaft 53 that the reciprocating heads 48 are fed forward or backward in which action the links 46 serve to pivot the legs into and out of operative position. In Fig. 5 a leg is shown in operative position ready for supporting the trailer when the tractor is drawn out from underneath the front end of the trailer. If the tractor-trailer is to be operated as a unit the crank may be turned and the supporting legs folded out of the way. The supporting legs are also down or in operative position as shown in Fig. 1, and when the trailers are supported on the rail car they may be left in this position or elevated as desired.

As shown in Fig. 1, there are three trailers supported on the rail car. The conventional sizes of railroad rolling stock and road vehicles are such as to permit some such arrangement as this, although a greater or lesser number of trailers may be transported on one car. The trailers may be disposed upon the railroad car in any suitable manner. One way of doing this is to run the trailers up on an elevated runway with the trailers straddling the rails, and then disposing the railroad car underneath the trailers. The trailers may then be fastened in some way to the railroad car, and then upon movement of the railroad car, trailers move with it, and then, moving off of the elevated runway they come to rest upon the supporting structure of the railroad car. Such an arrangement has heretofore been disclosed to the public and a detailed description and disclosure is not herein necessary.

I claim:

1. A support for a semi-trailer comprising a supporting leg at each side of a trailer frame, means pivotally mounting each leg to a trailer frame, a pair of screw shafts journaled in the frame, one near each side thereof and extending lengthwise of the frame, a transverse shaft journaled in the frame and extending from one side to the other, gear connections between each of the screw shafts and transverse shaft, means reciprocably mounted in the frame and having a screw thread engagement with the screw shafts, links connecting the legs with said means, and means for rotating said transverse shaft.

2. A support for a semi-trailer comprising a supporting leg at each side of a trailer frame, a means pivotally mounting each leg to a trailer frame, a pair of screw shafts journaled in the frame, one near each side thereof and extending lengthwise of the frame, a transverse shaft journaled in the frame and extending from one side to the other, gear connections between each of the screw shafts and transverse shaft, a pair of members reciprocably mounted in the frame each having an internally threaded aperture into which the respective screw shafts are threaded, a pair of links one connecting one leg with a reciprocably mounted member and the other connecting the other leg with a reciprocably mounted member, and means for rotating the transverse shaft.

3. A support for a semi-trailer comprising a pair of supporting legs one at each side of the trailer frame, means pivotally mounting each leg to the trailer frame so that the legs are entirely independent of each other, a pair of screw shafts journaled in the frame, one on each side of the frame and to the rear of the legs, a single transverse shaft journaled in the frame and having its ends accessible near the sides of the frame, gear connections between the transverse shaft and both screw shafts, a pair of reciprocably mounted members carried by the frame which, respectively, have screw threaded engagement with the two screw shafts, a pair of links one connecting one leg and one reciprocably mounted member, and the other connecting the other leg with another reciprocably mounted member, and means for rotating said transverse shaft including a handle-receiving formation on each end of the transverse shaft.

4. A supporting leg structure for a semi-trailer comprising two spaced leg members, bracing members connecting the leg members and joining them into a single leg structure, a ground engaging wheel, a journal for the wheel comprising a member connecting the leg members at one end, means pivotally mounting the leg members at their other end to the trailer frame, leg controlling means comprising an element movable in the trailer frame, and a link connecting the said movable element and the leg.

5. A leg structure for a semi-trailer comprising a pair of leg members each pivotally mounted to the trailer frame and extending therefrom in a downward direction, a ground-engaging wheel journaled between the leg members at their lower end by a journal member connecting the leg member, a plurality of transverse bracing members connecting the two leg members and joining them into a single leg structure, a link pivotally connected to one of said transverse bracing members, movable means carried by the trailer frame, said link being connected to said movable means, and means for controlling the movable means for pivoting the leg into and out of operative position.

In testimony whereof I affix my signature.

FREDERICK M. REID.